US008702468B2

(12) United States Patent
Walterscheid

(10) Patent No.: US 8,702,468 B2
(45) Date of Patent: Apr. 22, 2014

(54) TOY HAVING HARD MOLDED BODY WITH SOFT ELASTOMERIC APPENDAGES AND ITS ASSOCIATED METHOD OF MANUFACTURE

(75) Inventor: Steve Walterscheid, Banks, OR (US)

(73) Assignee: KMA Concepts Limited, Hong Kong (HK)

( * ) Notice: Subject to any disclaimer, the term of this patent is extended or adjusted under 35 U.S.C. 154(b) by 241 days.

(21) Appl. No.: 13/019,995

(22) Filed: Feb. 2, 2011

(65) Prior Publication Data

US 2012/0196503 A1 Aug. 2, 2012

(51) Int. Cl.
*A63H 3/04* (2006.01)

(52) U.S. Cl.
USPC .......... 446/390

(58) Field of Classification Search
USPC .......... 446/390, 385, 486, 491; D11/160
See application file for complete search history.

(56) References Cited

U.S. PATENT DOCUMENTS

| | | | | |
|---|---|---|---|---|
| 4,657,519 | A * | 4/1987 | Kobayashi | 446/376 |
| 5,624,294 | A * | 4/1997 | Chen | 446/253 |
| 5,858,262 | A * | 1/1999 | Lebensfeld | 249/98 |
| 7,785,170 | B2 | 8/2010 | Chernick et al. | |
| 2007/0259597 | A1 * | 11/2007 | Wong et al. | 446/320 |

* cited by examiner

*Primary Examiner* — Gene Kim
*Assistant Examiner* — Amir Klayman
(74) *Attorney, Agent, or Firm* — LaMorte & Associates, P.C.

(57) ABSTRACT

A method of manufacturing a toy assembly and the resulting toy assembly. A polymer body is molded from a high-bounce material. In a second injection molding process, an elastomeric gel material is molded through an opening in the body. A tube structure is provided having an interior conduit. At least one post is positioned within the tube structure. A toy body is molded around the exterior surface of the tube structure. A form of elastomeric gel material is molded through the interior conduit of the tube structure and around each post. This anchors the molded form of elastomeric gel material within the body of the toy. The form of elastomeric gel material extends from the ends of the tube structure to create the appendages.

17 Claims, 5 Drawing Sheets

12 10 30 14 32 24 12 10 22 20 28 30 14 34 24 26 32 21 16

10
12
14
18
19
20
24
30
32
34

TOY HAVING HARD MOLDED BODY WITH SOFT ELASTOMERIC APPENDAGES AND ITS ASSOCIATED METHOD OF MANUFACTURE

BACKGROUND OF THE INVENTION

1. Field of the Invention

In general, the present invention relates to toys having appendages molded from elastomeric materials. More particularly, the present invention relates to the methodology of molding elastomeric material into a toy structure of different materials.

2. Prior Art Description

There are many commercial toy products and novelties that are molded from soft elastomeric materials, such as a thermoplastic rubber (TPR), thermoplastic elastomers (TPE) and styrene-based block copolymers. Such elastomeric materials are often called elastomeric gels because they are so soft that the material feels squishy or gel-like to the touch. Such materials are highly elastic and have a very high tear strength. This has made such materials very popular in the toy industry. Toy characters made from such elastomeric materials can be stretched many times their normal size without breaking.

Elastomeric gel material has a relatively low melting point as compared to other synthetic elastomers. Accordingly, it has proven very difficult to produce a molded toy that contains both elastomeric gel material and traditional plastics because of the disparity in the required molding temperatures. As a result, if a toy were to include both traditional plastics and elastomeric gel material, the elastomeric gel material is typically adhered or joined to the toy in a secondary process.

Elastomeric gel material is highly elastic and deforms greatly when subjected to a tension force. This physical characteristic makes elastomeric gel material very difficult to anchor to the structure of a toy. If the elastomeric gel material is glued to a surface, the elastomeric gel material tends to pull away from the glue as it elongates. Likewise, the elongation of the elastomeric gel material makes the material nearly impossible to restrict with an interference fit. As a result, the only way to bind elastomeric gel material to other plastics is to either mold or cut a loop into the elastomeric gel material and then extending and anchored post through that loop. Creating such an interconnection between elastomeric gel material and other plastics is disclosed in U.S. Pat. No. 7,785,170 to Chernick, entitled Novelty Device Having Elastomeric Protrusions With Hard Plastic Terminations And Its Associated Method Of Construction. The obvious problem associated with such assembly techniques is that the assembly requires manual labor in a multi-step toy assembly procedure.

The present invention is a novel toy that combines both elastomeric gel material and other traditional plastic materials in a single assembly. The toy is manufactured using a novel technique that eliminates the need for expensive hand assembly. The details of the present invention toy and its method of manufacture are described and claimed below.

SUMMARY OF THE INVENTION

The present invention is a method of manufacturing a toy assembly and the toy assembly itself. The method of manufacture includes two injection molding steps. In the first step, a polymer body is molded. The body is preferably molded of a high-bounce material, such as a high-durometer polyurethane or a high-durometer synthetic rubber. This provides the body of the toy with the ability to bounce when impacted. In a second injection molding process, an elastomeric gel material is molded through an opening in the body. The elastomeric gel material has a molding temperature lower than that of the body. Consequently, a double injection molding process becomes possible.

A tube structure is provided having an exterior surface and an interior conduit. The interior conduit runs between a first open end and a second open end. At least one post is positioned within the tube structure. A toy body is molded around the exterior surface of the tube structure. A form of elastomeric gel material is molded through the interior conduit of the tube structure and around each post. This anchors the molded form of elastomeric gel material within the body of the toy. The form of elastomeric gel material extends from the ends of the tube structure to create the appendages of the toy.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention toy assembly can be embodied in many ways, the embodiment illustrated shows the system being used to create a toy having the same external appearance as that illustrated in U.S. Patent No. D628,120, to Walterscheid, entitled Ball With Elastomeric Arms. The illustrated embodiment is selected for its simplicity of appearance. Although the toy design illustrated in U.S. Patent No. D628,120 can be manufactured in many ways that are not subject to the present invention, the selected embodiment is a good example of a toy that has a simple body and simple extremities. The illustrated embodiment, therefore, is merely exemplary and should not be considered a limitation when interpreting the scope of the appended claims.

Figure 1:
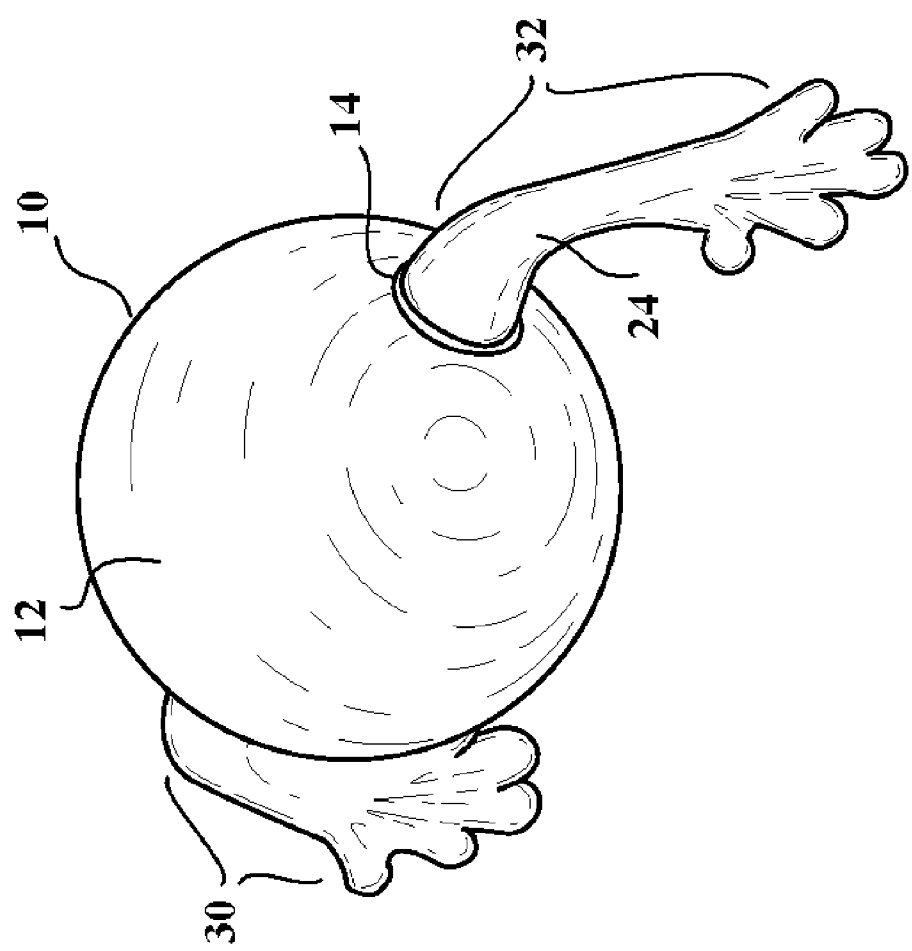
FIG. 1 is a perspective view of an exemplary embodiment of a toy assembly.
Figure 2:
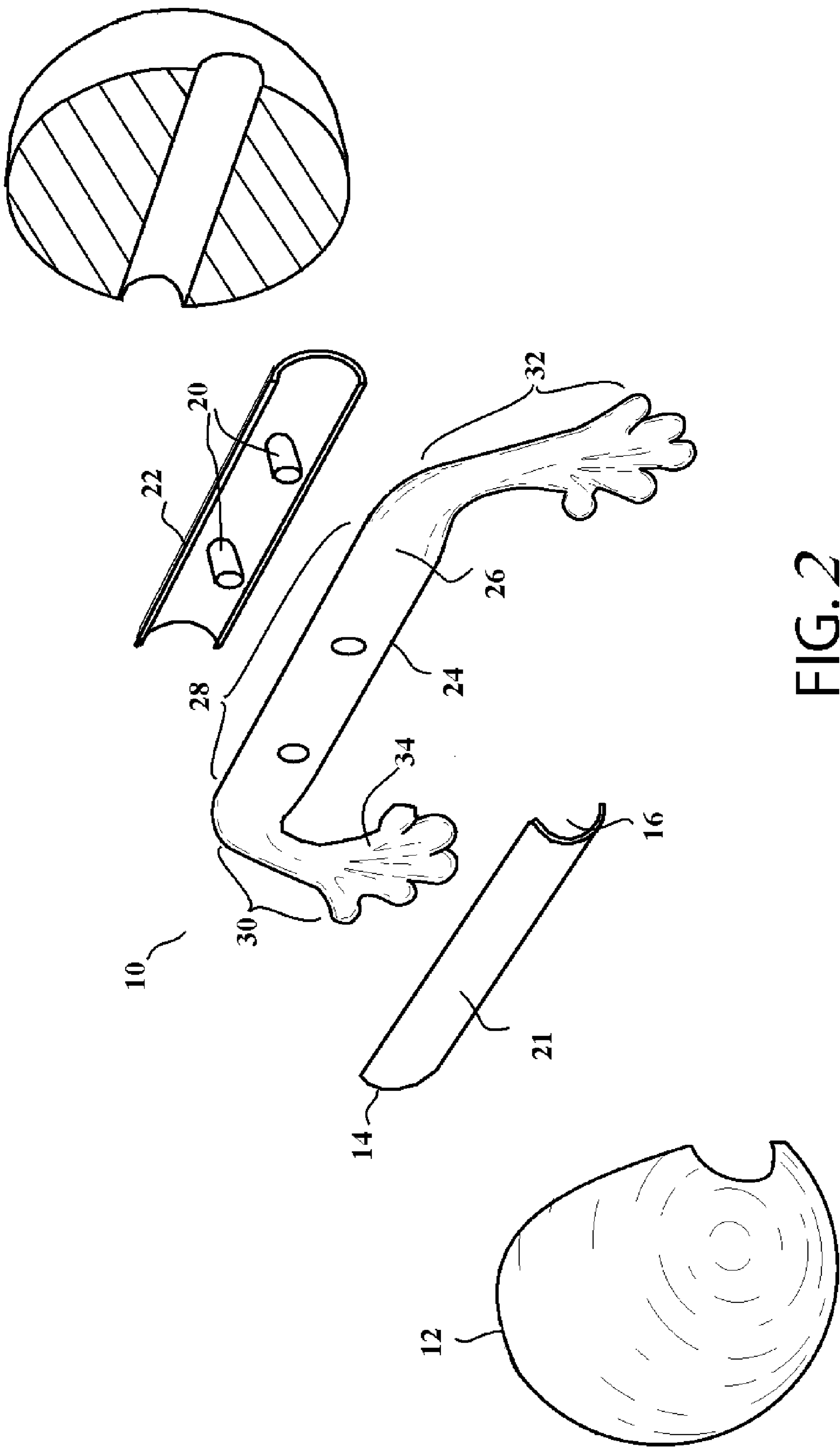
FIG. 2 is an exploded view of the exemplary embodiment of FIG. 1.
Figure 3:
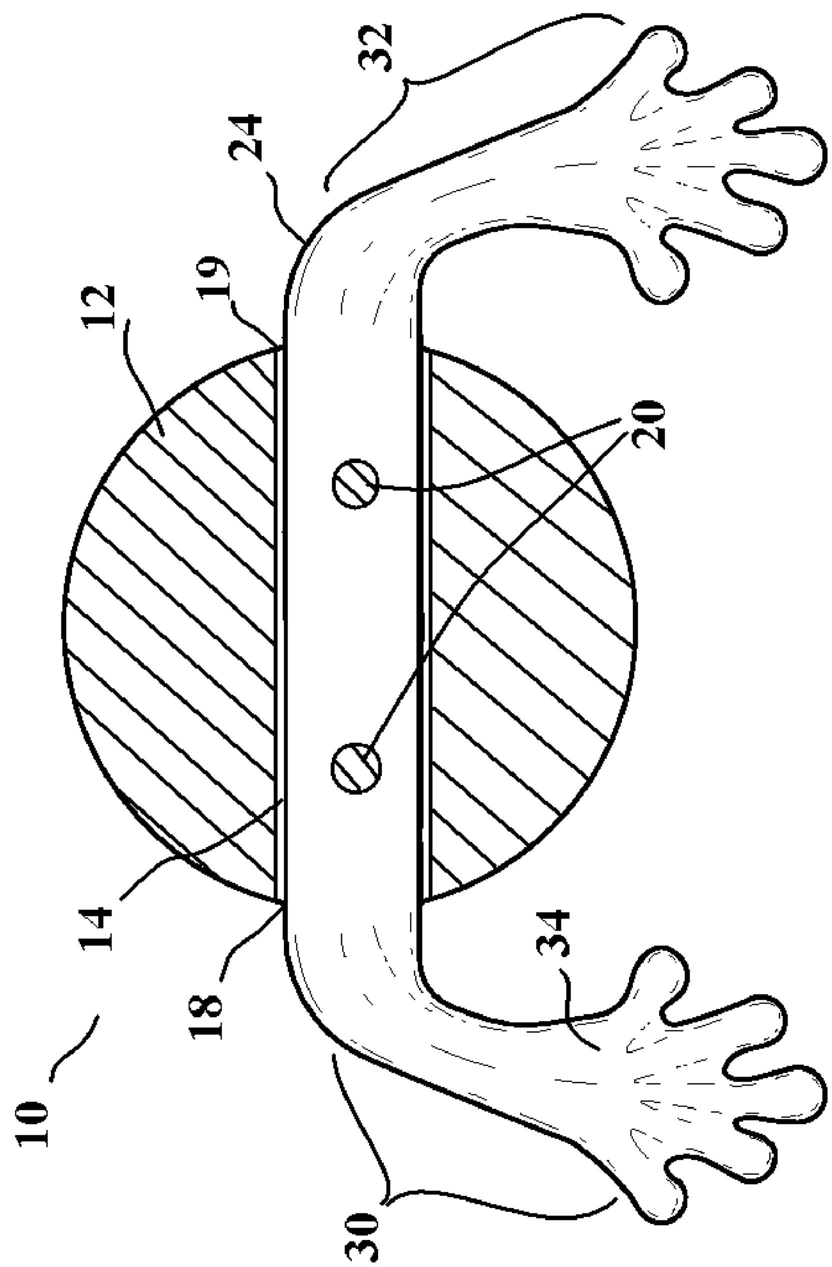
FIG. 3 is a cross-sectional view of the exemplary embodiment of FIG. 1.

Referring in unison to FIG. 1, FIG. 2 and FIG. 3, a toy assembly 10 is shown. The toy assembly 10 has a body 12 made from high durometer synthetic polymers, such as polyurethane or silicon rubber. Such materials have typical molding temperatures that exceed 450 degrees. These molding temperatures are significantly higher than the molding temperatures of common blends of elastomeric gel material, which are about 400 degrees.

A tube structure 14 is set into the body 12. The tube structure 14 is preferably made of a traditional hard plastic such as polypropylene, PETE, or HDPE. The tube structure 14 defines an open conduit 16 that extends between two open ends 18, 19. A plurality of posts 20 are present within the tube structure 14. The posts 20 traverse the conduit 16 defined by the tube structure 14. The posts 20 are oriented at a perpendicular to the primary longitudinal axis of the tube structure 14. However, the posts 20 are thinner than the open conduit 16 and do not completely block the open conduit 16.

The tube structure 14 can be molded as a single piece. However, in the illustrated embodiment, the tube structure 14 is shown molded into two halves 21, 22 in order to simplify the molding tools needed to create the tube structure 14 and thus reduce the cost of manufacture.

A molded form 24 of elastomeric gel material 26 extends through the open conduit 16 of the tube structure 14. The molded form 24 has a central section 28 and two end sections 30, 32. The end sections 30, 32 have a mirrored construction and are symmetrically formed about the central section 28. It is the central section 28 of the molded form 24 that fills the conduit 16 of the tube structure 14. The end sections 30, 32 of the molded form 24 extend out both open ends 18, 19 of the tube structure 14 and therein creates two appendages 34 of the overall toy assembly 10. In the illustrated embodiment, the appendages 34 are arms. However, many other shaped appendages can be used. As will be explained, the molded form 24 is molded through the open conduit 16 of the tube structure 14. As a result, the elastomeric gel material 26 of the molded form 24 is molded around the various posts 20 within the tube structure 14. The molding of the elastomeric gel material 26 around the posts 20 creates a physical interconnection between the molded form 24 and the tube structure 14. The central section 28 of the molded form 24 initially completely fills the open interior of the tube structure 14. However, if either or both of the end sections 30, 32 are pulled in tension, the molded form 24 elongates and thins. Although the pulled molded form 24 may thin to be much thinner than the conduit 16 of the tube structure 14, the presence of the posts 20 prevents the molded form 24 from being pulled out of the tube structure 14.

Figure 4:
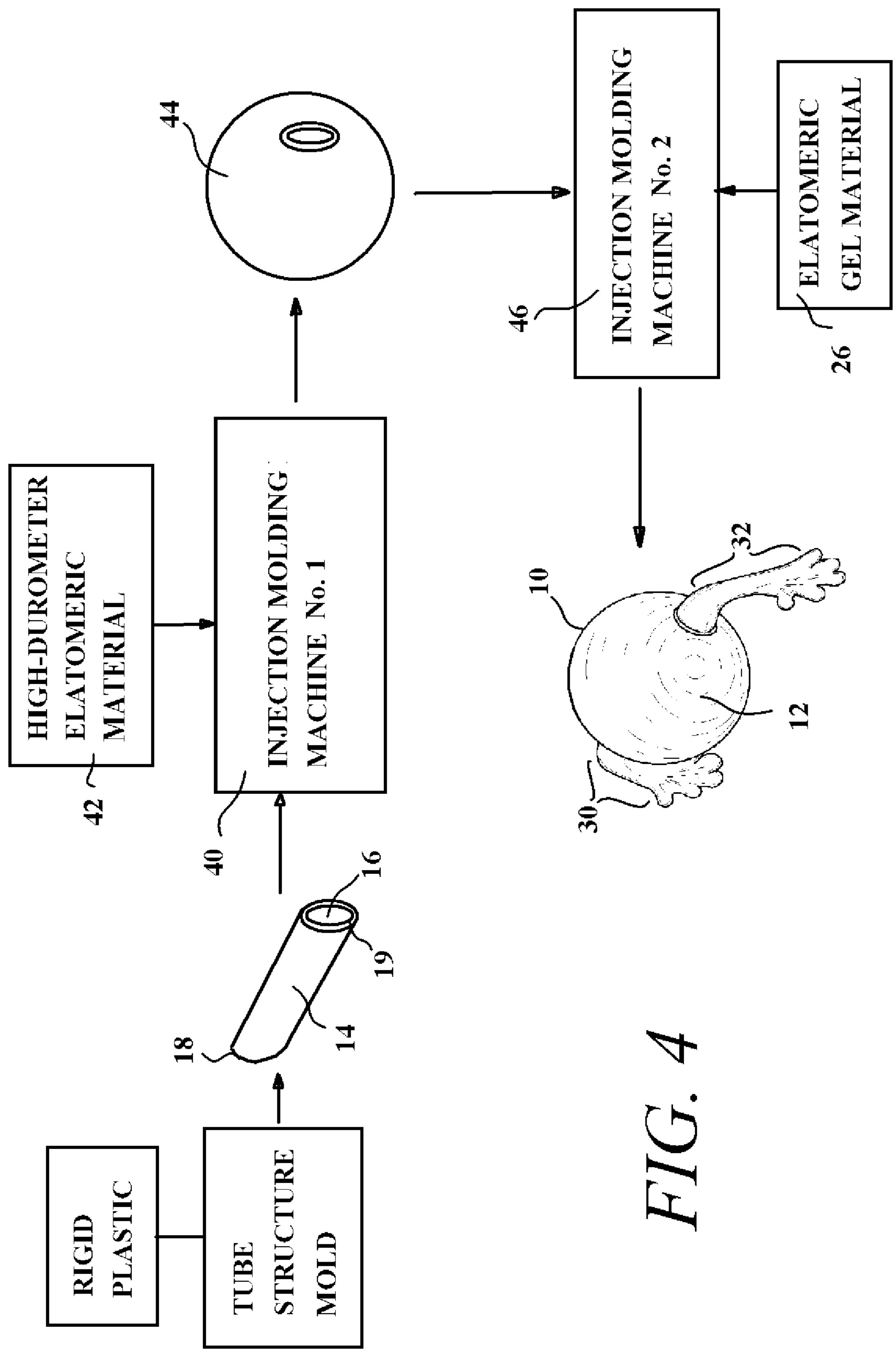
FIG. 4 is a schematic illustrating an exemplary method of manufacture.

Referring to FIG. 4 in conjunction with FIG. 2, the method of manufacturing the toy assembly 10 can best be explained. Initially, the tube structure 14 is molded from a rigid plastic. The tube structure 14 can be one piece or two pieces. If the tube structure 14 does have two halves 21, 22, the halves 21, 22 are assembled into a complete tube structure 14. As has been previously described, the tube structure 14 has an open conduit 16, two open ends 18, 19 and a plurality of internal posts 20.

The tube structure 14 is placed into a first injection molding machine 40. The open ends 18, 19 of the tube structure 14 are sealed while in the injection molding machine 40. A high-durometer elastomeric material 42 is then molded into the shape of the body 12 around the exterior of the tube structure 14. This creates a body/tube subassembly 44. The shape of the body 12 being shown in the subassembly 44 is round. However, it will be understood that many other shapes can also be used.

The subassembly 44 is removed from the first injection molding machine 40. Upon removal from the first injection molding machine 40, the two open ends 18, 19 of the tube structure 14 are again open and exposed. The subassembly 44 is then loaded into a second injection molding machine 46. Within the second injection molding machine 46, the exterior of the subassembly 44 is shielded and the open conduit 16 of the tube structure 14 is left exposed. Elastomeric gel material 26 is then molded into the molded form 24 through the open conduit 16 of the tube structure 14. During the molding process, the molten elastomeric gel material 26 fills the open conduit 16 of the tube structure 14 and flows around the various internal posts 20. The toy assembly 10 is finished when it is removed from the second injection molding machine 46.

It is preferred that the end sections 30, 32 of the molded form 24 extending out from either side of the tube structure 14 be mirror images of each other. In this manner, the end sections 30, 32 on either side of the toy assembly 10 will stretch evenly when pulled in tension. It will therefore be understood that when each of the end sections 30, 32 is grasped and pulled in opposite directions, the molded form 24 stretches evenly and the body 12 of the toy assembly 10 remains centered. The toy assembly 10 can therefore be played with in the manner of traditional string balls, such as is exemplified in U.S. Patent No. 213,642 to Farnum, entitled Ball-Toy.

Figure 5:
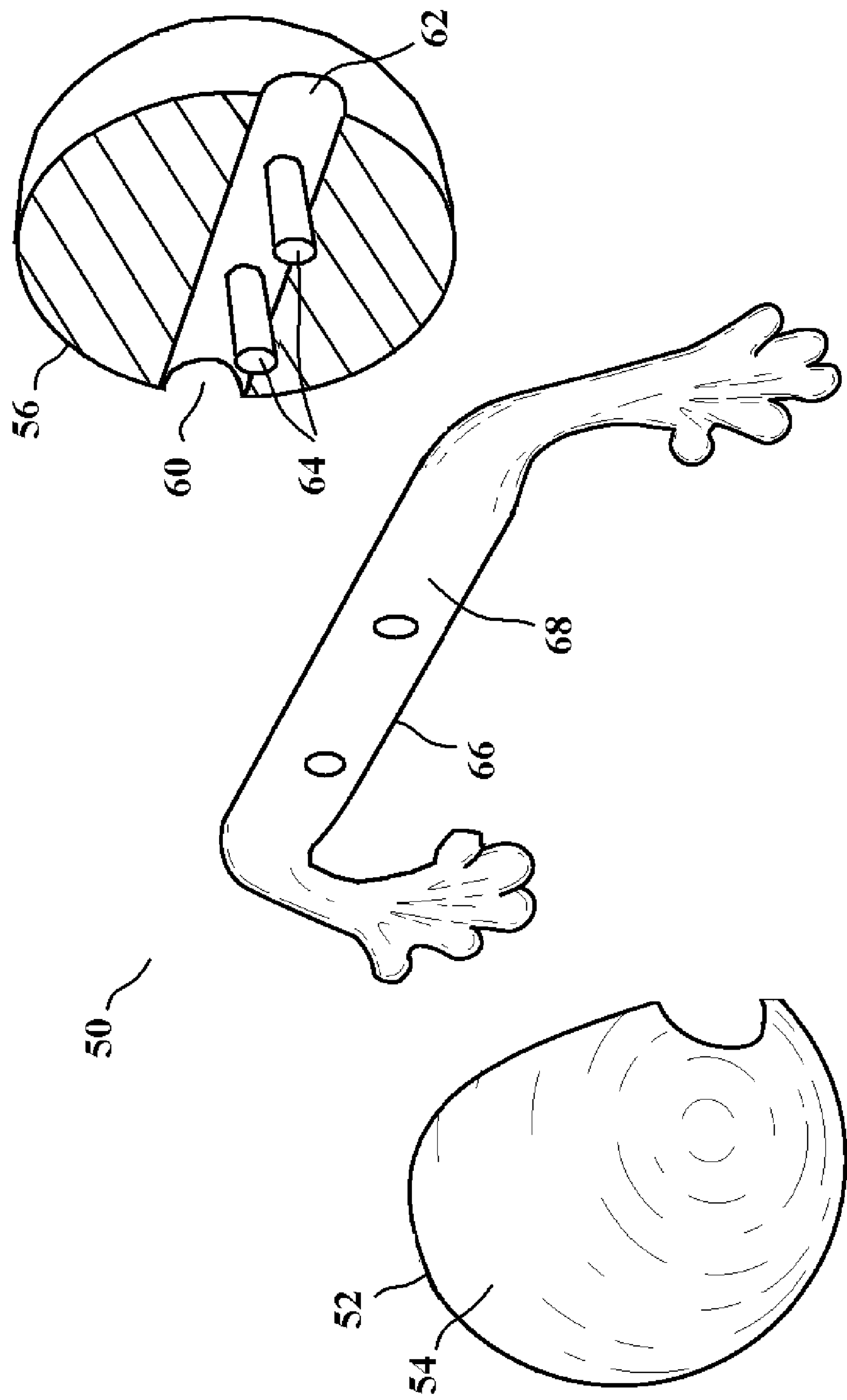
FIG. 5 is an exploded view of an alternate exemplary embodiment of the present invention.

Referring now to FIG. 5, an alternate embodiment of the present invention toy assembly 50 is shown. In this embodiment, a tube structure that is separate and distinct from the surrounding body is not used. Rather, the tube structure is formed by the body 52 itself. The toy's body 52 is molded into two body halves 54, 56. When the two body halves 54, 56 are placed together, the body halves 54, 56 form a tubular conduit 58 having two open ends 60, 62. At least one post 64 is present within the conduit 58 for the purposes previously described.

The two halves 54, 56 of the body 52 are then either adhesively interconnected or heat bonded together. This forms a complete body 52 having an open conduit 58 extending through the body 52. The body 52 is then placed in an injection molding machine. A molded form 66 of elastomeric gel material 68 is then molded through the open conduit 58. The elastomeric gel material 68 molds around the post 64 within the conduit 58 and therefore binds the molded form 66 in place within the conduit 58.

It will be understood that the embodiments of the present invention that are illustrated and described are merely exemplary and that a person skilled in the art can make many variations to those embodiments. For instance, the shape of the body, the shape of the extremities and the number of posts can be varied in many ways. All such embodiments are intended to be included within the scope of the present invention as defined by the claims.

What is claimed is:

1. A toy assembly comprising:

a body that has a grove that extends across the entire longitudinal axis of said body; a tube structure that has a conduit extending through said tube structure wherein said conduit extends along a longitudinal axis between a first open end and a second open end; said tube structure mates with said groove of said body;

at least one post disposed within said conduit, wherein said post is oriented at a perpendicular to said longitudinal axis; and a form of elastomeric gel material molded through said conduit and around said at least one post within said conduit, wherein said form of elastomeric gel material extends from both said first open end and said second open end of said conduit to create extremities that extend from said body.

2. The toy assembly according to claim 1, wherein said body is a molded polymer.

3. The toy assembly according to claim 2, further including a tube structure that defines said conduit, wherein said body is molded around said tube structure.

4. The toy assembly according to claim 1, wherein said body is round.

5. The toy assembly according to claim 1, wherein said form of elastomeric gel material has a central section and two end sections that extend from opposite sides of said central section, wherein said central section is disposed within said conduit.

6. The toy assembly according to claim 5, wherein said end sections are mirrored in shape and are symmetrically disposed about said central section.

7. The toy assembly according to claim 5, wherein said extremities are configured as arms.

8. The toy assembly according to claim 1, wherein said elastomeric gel material is a thermoplastic elastomer.

9. A method of manufacturing a toy assembly, comprising the steps of:

providing a tube structure having an exterior surface and an interior conduit, wherein said interior conduit runs between a first open end and a second open end along a primary longitudinal axis;

providing at least one post within said tube structure that extends into said conduit at a perpendicular to said primary longitudinal axis;

molding a toy body around said exterior surface of said tube structure; and molding a form of elastomeric gel material through said interior conduit of said tube structure and around said at least one post, wherein said form of elastomeric gel material extends from both said first open end and said second open end of said tube structure.

10. The method according to claim 9, wherein said elastomeric gel material has a first molding temperature and said step of molding a toy body around said exterior surface of said tube structure includes molding said toy body from a polymer having a second molding temperature that is higher than said first molding temperature.

11. The method according to claim 9, wherein said step of molding a toy body around said exterior surface of said tube structure includes molding a spherical toy body.

12. The method according to claim 9, wherein said step of molding a form of elastomeric gel material through said interior conduit of said tube structure, includes molding a form of elastomeric gel material having a central section that passes through said tube structure and two end sections that extends out and away from said tube structure.

13. The method according to claim 12, wherein said end sections are molded as arms.

14. The method according to claim 9, wherein said step of molding a toy body around said exterior surface of said tube structure includes placing said tube structure in an injection molding machine and forming said toy body around said tube structure within said injection molding machine, therein creating a body/tube subassembly.

15. The method according to claim 14, wherein said step of molding a form of elastomeric gel material through said interior conduit of said tube structure includes placing said subassembly in an injection molding machine and molding said form of elastomeric gel material through said interior conduit.

16. A method of manufacturing a toy assembly, comprising the steps of:

molding a toy body from a first polymer, wherein said body has a conduit extending therethrough between a first open end and a second open end;

providing at least one post inside said conduit;

molding a form of elastomeric gel material through said conduit and around said at least one post inside said conduit, wherein said form of elastomeric gel material extends into shapes beyond both said first open end and said second open end of said conduit in equal measure.

17. The method according to claim 16, wherein said toy body is spherical in shape.

* * * * *